UNITED STATES PATENT OFFICE.

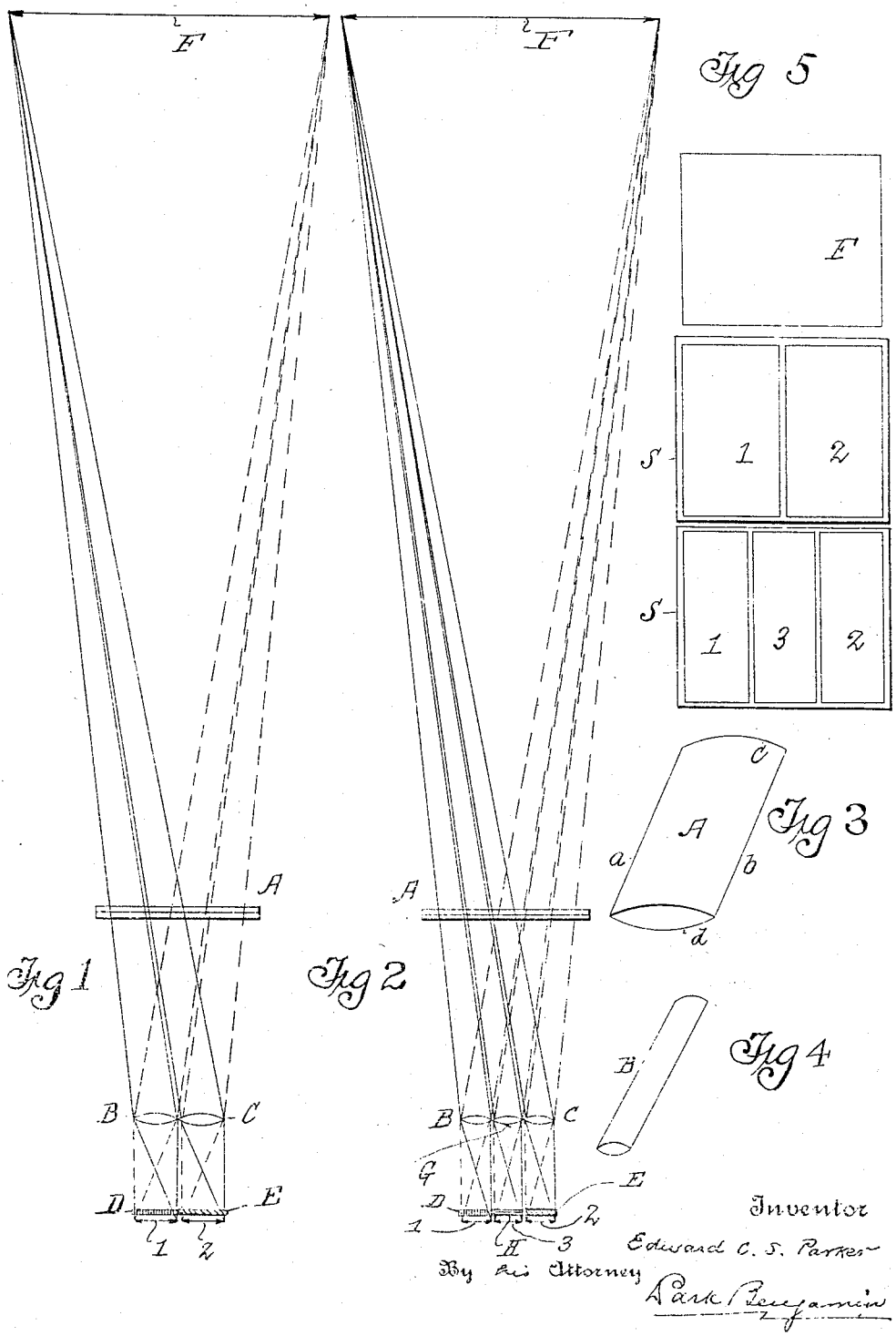

EDWARD C. S. PARKER, OF THE UNITED STATES NAVY.

PHOTOGRAPHIC APPARATUS.

1,328,294.  Specification of Letters Patent.  Patented Jan. 20, 1920.

Application filed May 9, 1919. Serial No. 296,011.

*To all whom it may concern:*

Be it known that I, EDWARD C. S. PARKER, of the United States Navy, a citizen of the United States, have invented a certain new and useful Improvement in Photographic Apparatus, of which the following is a specification.

The invention is an apparatus for making photographs in monochrome from a colored object and projecting an image of said object in corresponding or substantially natural colors upon a suitable screen. That is to say, the apparatus used as a camera produces images of the colored object in monochrome upon a sensitized transparent plate, film, or in general terms "slide", either stationary or moving, the light then proceeding from the object to the slide. When the light is caused to proceed in the reverse direction—that is, through the image on the slide and so through the apparatus to the screen—then an image of the object is projected in substantially natural colors upon said screen and either as a stationary or moving picture. The invention consists more particularly in the construction and arrangement of the lenses and means for dividing the pencil traversing the same into a plurality of separated pencils.

In the accompaanying drawings—

Figure 1 is an optical diagram, showing the arrangement of the lenses for producing two images of the object upon a sensitized slide and for projecting said image as a single image in colors upon a screen. Fig. 2 is a similar diagram, showing the apparatus arranged to produce three images. Fig. 3 is a perspective view of the lens A. Fig. 4 is a perspective view of one of the lenses B, C. Fig. 5 illustrates an object and the narrowed images produced by the apparatus on the sensitized slide.

Similar numbers and letters of reference indicate like parts.

A, Fig. 3, is a double convex cylindrical lens; two edges $a$, $b$ of which are straight and formed by the junction of the oppositely arc-shaped surfaces $c$, $d$. B, C, Fig. 4, are similar lenses, narrower than lens A. The lenses B, C are placed with the axes of their curved surfaces in the same plane and parallel, and also perpendicular to the axis of the curved surfaces of lens A. Should light rays from a given object F traverse either lens A or lenses B, C only, there will be produced upon a slide a more or less confused appearance of intermingled masses of light and shade. When, however, the lens A and the lenses B, C are disposed as stated, then the lenses B, C divide the rays traversing lens A into two separate sets or groups of rays, each of which groups will produce an image of the object upon the sensitized slide S which may be a fixed plate or a moving picture film. In the path of each group of rays, respectively, I place light filters D and E. Filter D may be of red glass and will, therefore, cut off the green rays, and filter E may be of green glass and, therefore, cut off the red rays. The two images 1 and 2 on the sensitized slide will be in monochrome, but the image 1 will be made by light free from green rays and the image 2 by light free from red rays. If the object be in the shape of a parallelogram, for example, as shown in Fig. 5 at F, then the two images 1 and 2, by reason of the shapes and arrangement of the lenses, will be narrowed in width; or in other words, the ratio of the dimensions of each image 1, 2 will be different from the ratio of the dimensions of the object F.

The images 1, 2 being produced and fixed upon a transparent sensitized slide S, if the source of light now be placed in rear of the slide so that the rays therefrom will pass through the apparatus in the reverse direction—that is, through the slide, light filters and lenses—an image of the object in colors corresponding to those of the object (so far as is possible by reproduction of red and green and combinations thereof) will be projected upon any suitable screen. As the images on the slide will be negative, they should be changed to positive in the usual way before projection, if it be desired not to disturb the light filters. Otherwise if the negative slide is retained, the two filters must be exchanged, the green taking the place of the red and the red taking the place of the green.

In Fig. 2, I illustrate the apparatus as arranged for three color work. Here I use a third lens G interposed between the lenses B, C and similar thereto, and also a third light filter H interposed between lens G and the slide, so that besides the images 1, 2 a third image 3 is produced by lens G from the object F, similar to the images 1 and 2. The third light filter may be of blue glass to stop out yellow rays, and will be replaced by a yellow glass when the light is reversed in the apparatus, as before described. The three images 1, 2, 3 may be projected in the manner already described to form a single picture on the screen in red, green and blue and combinations of said colors.

In another application for Letters Patent Serial No. 296,008, filed by me May 9, 1919, I have described and claimed the method of producing monochrome images upon a sensitized slide and of projecting the same to reproduce the object in substantially natural colors upon a screen, and also another form of apparatus wherein said method may be embodied. The subject-matter of said application is, therefore, not herein claimed.

I claim:

1. A photographic apparatus, comprising a converging cylindrical lens, a plurality of converging cylindrical lenses disposed edge to edge with their central longitudinal axes in the same plane and the axes of their curved surfaces parallel and relatively perpendicular to the axes of the curved surfaces of said first-named lens and receiving light rays traversing said first-named lens, whereby said light rays are divided into a plurality of separate groups of rays, and a sensitized slide receiving the images formed by said plurality of lenses.

2. A photographic apparatus, as in claim 1, further including light filters of different colors respectively interposed in the paths of said separated groups of rays.

In testimony whereof I have affixed my signature in presence of two witnesses.

EDWARD C. S. PARKER.

Witnesses:
GERTRUDE T. PORTER,
MAY T. McGARRY.